United States Patent [19]

Aström et al.

[11] Patent Number: 4,758,943
[45] Date of Patent: Jul. 19, 1988

[54] METHOD AND AN APPARATUS FOR AUTOMATICALLY TUNING A PROCESS REGULATOR

[75] Inventors: Karl J. Aström; Tore Hägglund, both of Lund, Sweden

[73] Assignee: Hightech Network AB, Malmo, Sweden

[21] Appl. No.: 946,569

[22] PCT Filed: Mar. 26, 1986

[86] PCT No.: PCT/SE86/00137
§ 371 Date: Dec. 3, 1986
§ 102(e) Date: Dec. 3, 1986

[87] PCT Pub. No.: WO86/05896
PCT Pub. Date: Oct. 9, 1986

[30] Foreign Application Priority Data

Apr. 3, 1985 [SE] Sweden .................................. 8501665

[51] Int. Cl.⁴ ............................................. G05B 13/02
[52] U.S. Cl. ................................. 364/157; 364/553; 364/148; 364/149; 364/179; 318/561; 318/636; 318/610
[58] Field of Search ........ 364/148, 149, 151, 157–163, 364/178, 179, 553; 318/561, 569, 610, 620, 636

[56] References Cited

U.S. PATENT DOCUMENTS

| | | | |
|---|---|---|---|
| 3,532,862 | 10/1970 | Dahlin | 364/157 |
| 3,646,454 | 2/1972 | Southern | 364/161 X |
| 4,213,175 | 7/1980 | Kurihara | 364/161 X |
| 4,214,300 | 7/1980 | Barlow et al. | 364/157 X |
| 4,277,945 | 7/1981 | Esthimer et al. | 364/161 |
| 4,407,013 | 9/1983 | Arcara et al. | 364/157 |
| 4,415,966 | 11/1983 | Herzog | 364/161 X |
| 4,466,054 | 8/1984 | Shigemasa et al. | 364/157 X |
| 4,549,123 | 10/1985 | Hagglund et al. | 364/157 X |

Primary Examiner—Jerry Smith
Assistant Examiner—Steve Hoang
Attorney, Agent, or Firm—Pollock, Vande Sande & Priddy

[57] ABSTRACT

Method for adjusting the setting of a digital process regulator on the basis of the result obtained from a simple relay feedback experiment. When an adjustment of the regulator setting is to be made, the relay feedback is connected in the control feedback circuit instead of the regulator in order to cause self-oscillation. The self-oscillation signal is utilized to calculate the new setting of the regulator.

11 Claims, 2 Drawing Sheets

METHOD AND AN APPARATUS FOR AUTOMATICALLY TUNING A PROCESS REGULATOR

FIELD OF THE INVENTION

The present invention relates to a method for adjusting the setting of a digital process regulator with the aid of the result obtained from a simple relay feedback experiment.

BACKGROUND OF THE INVENTION

A serious problem encountered with all digital regulators is one of obtaining in a simple fashion those parameters which are to be used for tuning the regulator. Applicants' U.S. Pat. No. 4,549,123 describes a method which utilizes the fact that many processes experience periodic oscillation with relay feedback. A simple relay feedback experiment is carried out, and the amplitude and period of the resultant oscillation is used to tune a PID-type regulator (PID stands for Proportional, Integrated, Derivating) on the basis of the control concept according to Zeigler-Nichols-like design methods. This prior art tuning method is thus based solely on knowledge of the amplitude and period of the oscillation. Although this method is successful in the majority of cases, it is encumbered with the fundamental drawback that the model is based solely on one point in the frequency curve of the open loop system in a Nyquist diagram.

A process model can also be determined experimentally by first selecting a sampling period and introducing pertubation signals, whereafter the process mode is obtained with the aid of some suitable parameter assessment method. In those cases in which the regulator is tuned automatically, the oscillations are generated by conventional feedback and the parameters determined recursively and progressively, as further measurements become available.

The sampling period is a critical parameter, both in respect of conventional parameter estimation and of adaptive control. In order to estimate the sampling period, it is necessary to have prior knowledge of the time scale of the model and of the system engaged. This has long been the stumbling block in achieving automatic model construction and adaptive regulation or tuning.

SUMMARY OF THE INVENTION

In accordance with the invention, the result of a simple relay feedback experiment is used to acquire the requisite knowledge of the process. The difference between the above-mentioned earlier method employing a relay feedback experiment and the method according to the invention, is that instead of using solely amplitude and period of the oscillating signal obtained on the output when carrying out the experiment, the method according to the invention also utilizes the knowledge of the shape of the curve obtained in the form of an output signal from a process effected with relay feedback during one stage of the experiment. Accordingly, the curve obtained within one period is sampled at a plurality of points thereon and the sampling values obtained at these points on the curve are used to make an accurate calculation of a regulator means suitable for adaptive modification of the process concerned. This calculation must be made in accordance with certain rules, in a manner such that a computer device, such as a microprocessor, is able to calculate an efficient regulator in a simple and ready manner, directly from the sampling values obtained. As a result of the method according to the invention there is obtained a model which is directly adapted for digital regulation. Distinct from the known prior art method, the calculated or computed Regulator does not have the form of a PID-regulator. The method according to the invention also provides the possibility of calculating the dead-time of the process in a simple fashion. Dead-time is a factor which is often found problematic with adaptive regulators and which has in fact led to the limited use of adaptive systems.

The sampling points may be uniformly distributed over one period, although the selection of irregular sampling point distribution is also a conceivable procedure. According to a further development of the invention, the number of sampling points can be varied.

BRIEF DESCRIPTION OF THE DRAWINGS

In order that the invention may be more clearly understood, reference will now be made to the accompanying drawings, in which an embodiment of the invention is shown for purposes of illustration, and in which.

DESCRIPTION OF THE PREFERRED EMBODIMENT

Figure 1:
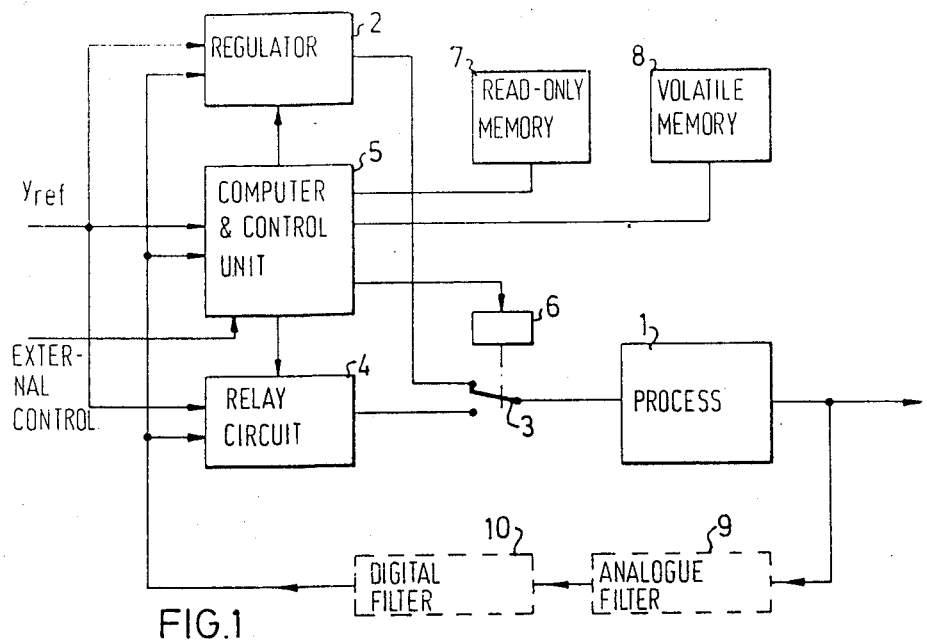
FIG. 1 is a block schematic of a regulator system according to the invention.

FIG. 1 shows a block schematic of a system which can be regulated or controlled in accordance with the invention. A process 1 with the input signal u and the output signal y has feedback loop, which incorporates a regulator 2 connectable to the process through a controllable switch 3. A relay circuit 4 can be coupled alternatively to the regulator 2 in the feedback loop of the process 1 by the switch 3. The regulator and the relay circuit each have two inputs, one of which is supplied with a reference signal or set-point signal $y_{ref}$, and the other of which is supplied with the process output signal y. The same input signals are also supplied to a computer and control unit 5, which preferably has the form of a microprocessor and which is capable of adjusting the regulator 2 through a line herefor. The control unit 5 is also effective in changing the setting of the switch 3, through a control means 6. The control unit 5 is also able to control the operational state or mode of the relay circuit 4. A read-only memory 7 and a volatile memory 8 are connected to the computer and control unit 5. The unit 5 may also be activated through external control means. With a system of this kind, all the units or elements 2-8 in FIG. 1 may be incorporated in one and the same microprocessor in a manner known per se, the regulator 2 and the relay circuit 4 being simulated by various program loops in the microprocessor.

In order to arrive at those particular laws which are to be followed in each particular case when employing digital control, it is necessary to ascertain a suitable sampling period and to detect a process model for a discrete time. The invention provides a method with which this can be achieved.

As soon as the setting of the regulator 2 is to be altered, which can either be done as an indication of an external control, as an indication of an impermissible wide deviation of the process output signal y from the reference signal $y_{ref}$, or when a given length of time has lapsed from the time of making the latest setting adjustment, such as a time lapse measured in minutes, in hours, or once per calendar day, the switch 3 is switched to its lower position, so as to connect the relay circuit 4 to the process feedback loop instead of the regulator. The manner of operation of the relay circuit 4 is such that when the output signal y of the process 1 exceeds the reference value $y_{ref}$, it produces an output signal u which constitutes the process input signal and which lies at a given value beneath the reference value, whereas when the signal y is lower than the reference value $y_{ref}$, it produces an output signal which lies at a given value above the reference value. The relays used can be encumbered with hysteresis. Consequently, the switch may be switched-over subsequent to the lapse of a short space of time from the time of indicating a reference value through-put. In other respects it has been found that in certain cases some reduction in noise can be achieved by actively introducing delayed switching of the relay, or a circuit having a switching function and functioning as a relay. This has no affect on the principle concept of the invention, however, even though the computation formulae given by way of example hereinafter for tuning the regulator must be corrected slightly with regard to the occurrence of hysteresis. The signal u is illustrated in FIG. 2, and the signal y in FIG. 3.

The oscillation obtained as a result of activating or switching in the relay circuit 4 constitutes the fundamental period during proportional feedback (compare the PID-regulator). This period is used as a basis for selecting a sampling period. Suitably, there is selected an even number of samplings, 2n samplings per period, with the same number of samplings n per half-period. The signal y often varies uniformly around the reference value $y_{ref}$.

Figure 2:
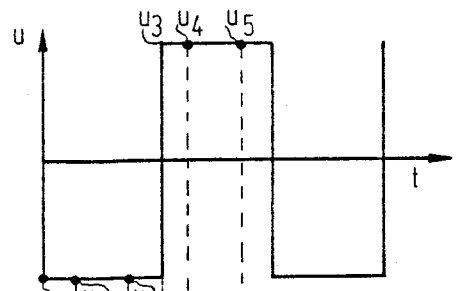
FIG. 2 illustrates an input signal which is applied to the process to be regulated and produced by relay feedback.
Figure 3:
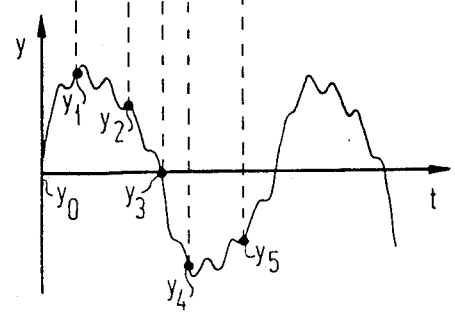
FIG. 3 illustrates the signal output of the same process, with relay feedback.

In FIGS. 2 and 3 there has been chosen by way of example n sampling points for one half-period, i.e. n=3. For the first n sampling points $$u_0 = u_1 = \ldots = u_n = -1 \tag{1}$$

for which there is obtained the respective output signal values $$Y_0, Y_1, \ldots Y_n \tag{2}$$

at respective time points t=0, 1, .. n.

(In the case of sampling points selected during the other half-period $$u_{n+1} + \ldots + u_{2n} = 1$$

and the respective output signal values are:

$$y_{n+1}, \ldots Y_{2n})$$

A conventional steady state model in a time discrete linear system can be written as:

$$y(t) + a_1 y(t-1) + \ldots + a_m y(t-m) = b_1 u(t-1) + \ldots + b_l u(t) \tag{3}$$

which can be re-written as $$A(z)Y(z) = B(z)U(z) + Q(z) \tag{4}$$

where Y(z), U(z), A(z) are the respective z-transforms for the time discrete system of the signals y and u, and where the respective constants $a_i$ and $b_i$ of the polynomials A and B, and the polynomial Q(z) correspond to an initial state which gives a stable periodic output signal. The z-transforms of the signals i and y are $$U(z) = -\frac{z^n + z^{n-1} + \ldots z}{z^n + 1} = -\frac{E(z)}{z^n + 1} \tag{5}$$

$$Y(z) = \frac{y_d z^n + y_{d+1} z^{n-1} + \ldots + y_{d+n-1} z}{z^d(z^n + 1)} = \frac{D(z)}{z^d(z^n + 1)} \tag{6}$$

where d is the degree of the polynomial A minus the degree of the polynomial B. The equation (4) can be written as $$A(z)D(z) + z^d B(z)E(z) = z^d(z^n + 1)Q(z) \tag{7}$$

This equation determines the polynomials A, B and Q. When equating coefficients of equal powers of z, there is obtained n+deg. A+1 linear equations with which to determine the coefficients in the model. In the generic case it is therefore necessary to select n > Z × deg. A. It is thus a straightforward matter to determine the coefficients of the process model in the equation expression (7) from the wave-form $Y_o, Y_1 \ldots Y_n$ of the periodic solution.

When the relay circuit 4 is connected to the process 1, through the switch 3, the computer unit 5 detects the signal y and determines its period, and effects a sampling process at a given number of sampling points on the first half period of the signal y. The computer unit 2 has a number of process models stored in the read-only memory 8, suitably of the form $$y(k+1) = a_1 y(h) + \ldots + a_m y(k-m) + b_1 u(k-i) + \ldots + b_l u(k-il) \tag{8}$$

Figure 4:
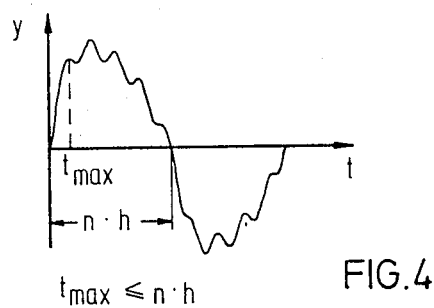
FIG. 4 illustrates the process output signal obtained with relay feedback, and also illustrates estimation of the time delay, i.e., the dead time.

For example, an advantage is gained when selecting the following combinations of m and l; m=1, l=2; m=2, l=1; m=2, l=2. The following exemplifying calculation utilizes m=1, l=2. FIG. 4 illustrates the curve obtained from the output signal y in the relay experiment. The curve is relatively complete with superposed wave-motion of various frequencies. The time point $t_{max}$ within the period where a local signal peak value occurs for the first time is determined by the computer unit 5. The computer unit then makes successive calculations with increasing values of i, starting from the sampling point occurring immediately after $t_{max}$, in order to calculate a regulator setting or adjustment for each i in a manner described in more detail hereinafter. $t_{max} \leq n.d$, where d is the sampling period (for similar sampling periods).

In order to ensure that the curve produced by the signal y is as free as possible from noise components, the computer unit 5 is conveniently designed to calculate a mean-value curve from the curve shape of several periods of the signal y, subsequent to the signal stabilizing after switching-in the relay feedback design. An advantage may also be gained by incorporating a noise filter prior to the signal output.

The following equations or expressions can be written for each value of i in the assumed process model incorporating the selected, exemplifying values m=1 and l=2.

$$A(z) = z^{i+1}(z-a) \quad (9)$$

$$B(z) = b_1 z + b_2 \quad (10)$$

$$Q(z) = q_0 z + q_1 \quad (11)$$

where $d = i + 2 - 1 = i + 1$. These equations can be inserted in equation (7) and the values of a, $b_1$, $b_2$, $q_0$ calculated, $q_1$ becomes equal to zero. By way of example, the values of a, $b_1$, $b_2$, $q_0$ when n=3 can be calculated from the following equations:

$$a = \frac{y_{i+2} - y_{i+3}}{y_{i+1} - y_{i+2}} \quad (12)$$

$$b_1 = \frac{-y_{i+1}^2 + y_{i+2}^2 + y_{i+3}^2 - y_{i+1}y_{i+3} - y_{i+2}y_{i+3} + y_{i+1}y_{i+2}}{2(y_{i+1} - y_{i+2})} \quad (13)$$

$$b_2 = \frac{y_{i+1}^2 + y_{i+2}^2 - y_{i+3}^2 - y_{i+1}y_{i+3} - y_{i+1}y_{i+2} + y_{i+2}y_{i+3}}{2(y_{i+1} - y_{i+2})} \quad (14)$$

$$q_0 = \frac{y_{i+1}^2 + y_{i+2}^2 + y_{i+3}^2 - y_{i+1}y_{i+3} - y_{i+2}y_{i+3} - y_{i+1}y_{i+2}}{2(y_{i+1} - y_{i+2})} \quad (15)$$

The equations are stored in the computer and control unit 5. Before calculating the values of these constants, the unit 5 examines the denominator and if finding the denominator equal to zero, continues to the next highest i.

Otherwise, the unit 5 calculates the values of all constants. When the model according to equation (b) above with the parameters a, $b_1$ and $b_2$ chosen by way of example, corresponds to a sampled continuous first order system with a time delay, the parameters a, $b_1$ and $b_2$ shall be positive. This compatability condition can be used to determine whether or not the time delay is correct. Consequently, if one of these constants should be found to be negative, the computer and control unit 5 will continue to calculate the constants for the next i in sequence, otherwise the unit continues to calculate a regulator model, for example in accordance with the followwing principles: Assume a characteristic polynomial for the feedback according to the equation:

$$z^{2(i+1)}P(z) = z^{2(i+1)}(z^2 + p_1 z + p_2) \quad (16)$$

where
$p_1 = 2e^{-\zeta\omega h}\cos(\zeta\omega h\sqrt{1-\zeta^2})$
$p_2 = e^{-2\zeta\omega h}$ $p_1$ and $p_2$ provide a translation to continual parameters and correspond to a second order response with the relative damping $\zeta$, and the angular frequency $\omega$. In order to obtain a pole placement design which provides a regulator with integral action, it is necessary to solve the Diophantine equation.

$$A(z)(z-1)R_1(z) + B(z)S(z) = z^{2(i+1)}P(z) \quad (17)$$

for those cases when n=3, there are given below examples of calculations for obtaining a regulator for i=0, 1, 2.

When i=0, i.e. when the first local peak value occurs immediately at the beginning of a period, the minimal degree solution is $$R(z) = (z-1)(z+r_1)$$
$$S(z) = s_0 z^2 + s_1 z$$

dar $$s_0 = \frac{1}{1-a}\left(\frac{P(1)}{B(1)} - a\frac{P(a)}{B(a)}\right)$$

$$s_1 = \frac{a}{a-1}\left(\frac{P(1)}{B(1)} - \frac{P(a)}{B(a)}\right)$$

$$r_1 = -\frac{b_2}{a}s_1$$

The regulator 2 is tuned or adjusted in accordance with the following model $$u(t) = (s_0+s_1)y_{ref} - s_0 y(t) - s_1 y(t-h) + + (1-r_1)u(t-h) + r_1 u(t-2h)$$

When i=1, the minimal degree solution is:

$$R_1(z) = z^2 + r_1 z + r_2$$

$$S(z) = s_0 z^3 + s_1 z^2$$

where $$s_0 = \frac{1}{1-a}\left(\frac{P(1)}{B(1)} - a^2\frac{P(a)}{B(a)}\right)$$

$$s_1 = \frac{a}{a-1}\left(\frac{P(1)}{B(1)} - a\frac{P(a)}{B(a)}\right)$$

$$r_2 = -\frac{b_2}{a}s_1$$

$$r_1 = \frac{1+a}{a}r_2 - \frac{b_1}{a}s_1 - \frac{b_2}{a}s_0$$

The regulator 2 is tuned or adjusted to the following model:

$$u(t) = (s_0+s_1)y_{ref} - s_0 y(t) - s_1 y(t-h) + + (1-r_1)u(t-h) + (r_1-r_2)u(t-2h) + r_2 u(t-3h)$$

When i=2 the minimal degree solution is $$R_1(z) = z^3 + r_1 z^2 + r_2 z + r_3$$

$$S(z) = s_0 z^4 + s_1 z^3$$

where $$s_0 = \frac{1}{1-a}\left(\frac{P(1)}{B(1)} - a^3\frac{P(a)}{B(a)}\right)$$

$$s_1 = \frac{a}{a-1}\left(\frac{P(1)}{B(1)} - a^2\frac{P(a)}{B(a)}\right)$$

$$r_3 = -\frac{b_2}{a}s_1$$

$$r_2 = \frac{1+a}{a}r_3 - \frac{b_1}{a}s_1 - \frac{b_2}{a}s_0$$

-continued $$r_1 = \frac{(1+a)}{a} r_2 - \frac{1}{a} r_3 - \frac{b_1}{a} s_0$$

The regulator 2 is tuned or adjusted according to the following model:

$$u(t) = (s_0 + s_1)y_{ref} - s_0y(t) - s_1y(t-h) + (1-r_1)u(t-h) + (r_1 - r_2)u(t-2h) + (r_2 - r_3)u(t-3h) + r_3u(t-4h)$$

The above calculations are given solely as suitable computations of the various values of n and i in different combinations. The computer and control unit 5 can be programmed to commence the calculations by applying a low value to n (for example n can be made as low as 2 initially, although it is sufficient to begin with n=3) and to calculate successively suitable models for all of the sampling points which follow $t_{max}$ within the first half-period, and to continue by setting a new value for n, equal to the earlier value of n plus 1, should the calculations for all sampling points provide methods which fail to fulfil the set compatability conditions. Models for all sampling points occurring after $t_{max}$ within the first half—period are then calculated with this new value of n. The unit 5 continues to operate in this way, until a calculation is reached which provides a model fulfilling all the set compatibility conditions.

Thus, the program for which the unit 5 is designed may have stored therein equations or expressions which are common to those computations which must be carried out for each combination of n and i and also equations or expressions which are individual for the different combinations of n and i. The most important factor in this regard is that the unit 5 calculates for each condition of n and i the model which will provide optimal control with precisely the combination concerned.

Important signal conditions are highly significant with respect to good control. In the case of digital control, it is particularly important to use a good filter which will counteract the unfavourable effect caused when the control signal is changed stepwise instead of continuously. Since such filters will depend on the sampling period, it is normally difficult to make a good choice a priori. When applying the procedure for constructing a model for control purposes as described here, the sampling period can be determined automatically, i.e. a fixed value for n can be chosen from the very beginning. It is then possible also to match the filter to the particular conditions.

When the sampling period is h, the Nyquist-frequency is $\pi/h$ rad/s. Assuming that there is used a second order Butterworth filter to obtain a decrease in amplification of 16 at the Nyquist frequency, the bandwidth chosen should then be $\pi/(4\omega)$.

The following procedure can be applied to obtain a filter of readily adjustable bandwidth. Select a high sampling frequency, i.e. n is relatively high, and connect an appropriate analogue prefilter 9 in the feedback line between the process output and the other input of the respective units 2,4 and 5. Connect a digital filter 10 in series with the prefilter 9, which digital filter effects the additional filtering required, and sample the output of this filter with period h. This enables the appropriate filtering to be achieved in a simple and efficient manner. It is also possible to use a plurality of digital filters, with each filter matched to a particular sampling period h and to incorporate a switch which will connect-up the most suitable of these filters in the circuit (not shown). As illustrated in FIG. 1, the filters 9 and 10 are preferably both connected-up in the process feedback loop for both the regulator 2 and the relay circuit 4. Alternatively, the filters 9 and 10 may be connected solely to the second input of the regulator (this circuit not being shown).

Many modifications are possible within the scope of the invention.

What is claimed is:

1. A method for tuning automatically a process regulator (2), in which a relay feedback (4) can be connected alternatively to the regulator (2) in the control feedback circuit of the process, and wherein, whenever retuning of the regulator is required, the relay feedback is connected in the circuit instead of the regulator in order to cause self-oscillation of the system process/relay feedback circuit, and in which said self-oscillation is used to calculate the setting of the regulator, said process comprising the steps of
   (a) indicating within one period of self-oscillation a time point ($t_{max}$) at which a local signal peak value first occurs;
   (b) dividing the signal obtained within a half period into a selected number of n sampling intervals with intervals $h_i$ therebetween;
   (c) calculating the regulator control setting successively from various sampling intervals within the first half period of the oscillating period with a starting point from a model of the process beginning from the sampling interval occurring after said time point ($t_{max}$);
   (d) comparing the result of the calculations with given compatibility conditions; and
   (e) terminating the successive calculations, and applying the calculated control setting to the regulator (2) immediately upon reaching a calculation which satisfies the aforesaid compatability conditions.

2. A method according to claim 1, including the steps of
   (a) selecting the number of samplings n within a half-period successively, commencing with n equals at least 2;
   (b) making successive calculations with increasing values of n and calculating model parameters for all sampling intervals after $t_{max}$ within the first half-period for each n, until a calculation is reached which provides model parameters which fulfill set compatibility conditions.

3. A method according to claim 1 or 2, including making the calculations with the aid of z-transforms and a process model of the form $$y(k+1) = a_1y(h) + \ldots + a_my(k-m) + b_1u(k-i) + \ldots b_lu(k-i)$$

where $a_1 - a_m$, $b_1 - b_m$ are constants calculated with the aid of the z-transforms.

4. A method according to claim 3, wherein the process model incorporates one of the following combinations of m and l: m=1 and l=2; m=2 and l=1; m=2 and l=2.

5. A method according to claim 4, including the steps of using the values of the input and output signals of the process with relay feedback at the sampling points as the basis for constructing a z-transform of the input signal and the output signal; and by calculating the constants $a_1 - a_m$, $b_1 - b_m$ from the z-transformed process model so as to express the resultant sampled values $y_i$ on the output signal at different sampling points.

6. A method according to claim 5, including the steps of (a) applying a characteristic polynomial of the type $$z^{2(i+1)}P(z) = z^{2(i+1)}(z^2 + p_1 z + p_2)$$

where $p_1$ and $p_2$ are constants which both have a given relationship to relative damping, frequency of the system, and sampling frequency; (b) calculating the second order control model with the aid of the constants $p_1$ and $p_2$; and (c) tuning the regulator (2) in accordance with said second order model.

7. A method according to claim 1, wherein the curve shape of the period of self—oscillation on which the calculations are made is obtained by producing a mean value curve on several periods of the self-oscillation obtained through relay feedback.

8. A method according to claim 1 wherein with relay feedback a comparison is made in a manner known per se between a set-point value $y_{ref}$ and the process output signal; and the input signal to the process is switched from a value which is lower than the set-point value to a value which is higher than the set-point value and vice versa at a pre-selected level subsequent to the value of the process output signal having passed the set-point value $y_{ref}$, i.e. has effected its reversal with a pre-selected hysteresis.

9. Apparatus for automatically tuning a process regulator with the aid of a relay feedback (4) which can be alternatively connected to the regulator (2) in the feedback circuit of the process (1), said apparatus comprising (a) a computer and control unit (5) which when coupled to relay feedback, is effective to (a) detects a self-oscillating period of the system, (b) divide said period into half-periods at a selected number n of the sampling points, (c) detect a time point $t_{max}$ within one of the oscillation half-periods at which a local signal peak value occurs for the first time and effect successively a calculation of a process model for each sampling moment during the first half-period after $t_{max}$, and (d) to compare each calculation with stored compatability conditions, and immediately upon reaching a calculation which satisfies set compatability conditions inhibit calculation of the model for the next sampling period in line, and with control to the regulator (2) adjust the calculated model for control in the regulator.

10. Apparatus according to claim 9, wherein the computer and control means (5) includes a microprocessor in which there are stored calculating sequences for computing models which are individual for each theoretically possible sampling interval for each theoretically possible sampling interval division of the self-oscillating signal obtained when engaging the relay feedback (4).

11. Apparatus according to claim 9 or 10, wherein an analogue filter (9) and a digital filter (10) which can be tuned individually to each particular calculating process and which are incorporated in a regulator/process feedback loop, at least when the regulator is in its active mode.

* * * * *